US011963260B2

United States Patent
Salmela et al.

(10) Patent No.: US 11,963,260 B2
(45) Date of Patent: *Apr. 16, 2024

(54) METHODS AND ENTITIES FOR ENDING A SUBSCRIPTION

(71) Applicant: TELEFONAKTIEBOLAGET LM ERICSSON (PUBL), Stockholm (SE)

(72) Inventors: Patrik Salmela, Espoo (FI); Abu Shohel Ahmed, Espoo (FI); Kazi Wali Ullah, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 198 days.

This patent is subject to a terminal disclaimer.

(21) Appl. No.: 17/337,042

(22) Filed: Jun. 2, 2021

(65) Prior Publication Data
US 2021/0289342 A1  Sep. 16, 2021

Related U.S. Application Data

(63) Continuation of application No. 16/310,965, filed as application No. PCT/EP2016/064599 on Jun. 23, 2016, now Pat. No. 11,057,760.

(51) Int. Cl.
*H04W 8/18* (2009.01)
*H04W 60/06* (2009.01)
*H04W 12/30* (2021.01)

(52) U.S. Cl.
CPC ........... *H04W 8/183* (2013.01); *H04W 8/186* (2013.01); *H04W 60/06* (2013.01); *H04W 12/35* (2021.01)

(58) Field of Classification Search
CPC ....... H04W 12/35; H04W 8/205; H04W 8/18; H04W 12/04; H04W 12/40; H04W 12/08;
(Continued)

(56) References Cited

U.S. PATENT DOCUMENTS 11,240,382 B2 * 2/2022 Benkreira ........... H04M 15/705
2013/0252587 A1 9/2013 Ko et al.
(Continued)

FOREIGN PATENT DOCUMENTS

CN 103167465 A 6/2013
CN 103731823 A 4/2014
(Continued)

OTHER PUBLICATIONS

GSMA, RSP Architecture Version 1.0, Dec. 23, 2015, pp. 1-52, 2015.
(Continued)

*Primary Examiner* — Khalid W Shaheed
(74) *Attorney, Agent, or Firm* — Murphy, Bilak & Homiller, PLLC

(57) ABSTRACT

A method of ending a subscription performed in a network entity is disclosed. The method comprises receiving, from a device comprising an Embedded Universal Integrated Circuit Card, eUICC, a signed confirmation of a profile having been deleted in the device, the profile being associated with a subscription for the device; sending, to a Subscription Manager Data Preparation entity, a command for deletion of the profile; and deleting the user subscription and related profile in case an acknowledgement of the deletion of the profile is received from the Subscription Manager Data Preparation entity. Method in a device, method in a Subscription Manager Data Preparation entity, devices and entities, computer programs and computer program products are also provided.

12 Claims, 6 Drawing Sheets

(58) Field of Classification Search
CPC ... H04W 8/20; H04W 12/069; H04W 12/086; H04W 12/42
See application file for complete search history.

(56) References Cited

U.S. PATENT DOCUMENTS

| | | | |
|---|---|---|---|
| 2013/0340040 A1* | 12/2013 | Park | H04L 63/08 726/3 |
| 2014/0011541 A1* | 1/2014 | Cormier | H04L 9/3268 455/558 |
| 2014/0143826 A1* | 5/2014 | Sharp | G06F 21/604 726/1 |
| 2014/0237101 A1 | 8/2014 | Park | |
| 2014/0329502 A1* | 11/2014 | Lee | H04W 12/04 455/411 |
| 2015/0067351 A1 | 3/2015 | Wang et al. | |
| 2015/0143125 A1* | 5/2015 | Nix | H04W 76/27 713/171 |
| 2016/0021529 A1 | 1/2016 | Park et al. | |
| 2016/0173493 A1* | 6/2016 | Wane | H04W 12/06 455/411 |
| 2016/0301529 A1* | 10/2016 | Park | H04W 8/205 |
| 2017/0048251 A1 | 2/2017 | Guday et al. | |
| 2017/0180349 A1 | 6/2017 | Park | |
| 2017/0280320 A1 | 9/2017 | Caceres et al. | |
| 2017/0280321 A1 | 9/2017 | Caceres et al. | |
| 2019/0140837 A1* | 5/2019 | Cheng | H04W 12/40 |
| 2021/0280320 A1* | 9/2021 | Arora | G16H 15/00 |

FOREIGN PATENT DOCUMENTS

| | | |
|---|---|---|
| CN | 103781054 A | 5/2014 |
| CN | 105101165 A | 11/2015 |
| CN | 105282732 A | 1/2016 |
| EP | 2963955 A1 | 1/2016 |
| EP | 3171566 A1 | 5/2017 |
| JP | 2016531459 A | 10/2016 |
| JP | 2019519174 A | 7/2019 |
| WO | 2015136200 A1 | 9/2015 |
| WO | 2016010387 A1 | 1/2016 |
| WO | 2016023199 A1 | 2/2016 |
| WO | 2016080726 A1 | 5/2016 |

OTHER PUBLICATIONS

Unknown, Author, "RSP Architecture Version 1.0", GSM Association, Official Document SGP.21, Dec. 23, 2015, pp. 1-52.
Unknown, Author, "RSP Technical Specification Version 1.0", GSM Association, Official Document SGP.22, Jan. 13, 2016, pp. 1-114.

* cited by examiner

METHODS AND ENTITIES FOR ENDING A SUBSCRIPTION

RELATED APPLICATION

This application is a continuation application of U.S. patent application Ser. No. 16/310,965, filed Dec. 18, 2018, which is a national stage application of International Patent Application No. PCT/EP2016/064599, filed Jun. 23, 2016, and the disclosure of which are incorporated in their entirety by reference.

TECHNICAL FIELD

The technology disclosed herein relates generally to the field of remote subscriber identity module provisioning, and in particular to methods, entities, computer programs and computer program products for ending a subscription.

BACKGROUND

GSM Association (GSMA) has released technical specifications defining remote Subscriber Identity Module (SIM) provisioning for consumer devices and also documentation defining Remote Provisioning Architecture for Embedded Universal Integrated Circuit Card (UICC), which targets Machine-to-Machine (M2M) devices. The solutions differ a bit but have also many parts in common. An operator uses an entity denoted Subscription Manager Data Preparation (SM-DP/SM-DP+) for creation of SIM profiles that are later installed from the SM-DP/SM-DP+ entity to an Embedded UICC (eUICC) of a device. In the consumer device solution, the profile is installed through a Local Profile Assistant (LPA) in the device to an Issuer Security Domain Profile (ISD-P) on the eUICC in the device. On the M2M side, the SM-DP entity installs the profile via a separate (external) entity, a Subscription Manager Secure Routing (SM-SR), to the ISD-P on the M2M device. GSMA aims at merging these two solutions into a common remote subscription management solution.

Both solutions require the device owner to get a subscription for the device from the operator by providing the operator with relevant information about the device to be provisioned, optionally including eUICC identification (EID) and International Mobile Station Equipment Identity (IMEI). The subscription may, for instance, be obtained from a point of sales or via an operator's web page.

SUMMARY

Deletion of a user profile is, in the GSMA specifications for consumer devices, a local procedure in the device having an embedded SIM (eSIM). The user selects deletion of the profile, either directly from the device or, in case the device lacks user input possibilities, through a user interface (UI) of a primary device used for managing it. However, the deletion of the profile and/or subscription is not communicated to the network side. This means that even if a user deletes the profile in the device, the mobile network operator (MNO) will still have an active subscription provisioned, e.g. into its Home Subscriber Server (HSS) and the SM-DP entity may possibly store the associated profile together with its activation code. This is a waste of resources as well as lack of user friendliness. The operator could free up the International mobile subscriber identity (IMSI) of a deleted profile for use for some other subscription, which would be highly valuable especially in the future Internet of Things (IoT) world where the high number of IoT devices might be an issue for the IMSI space allocated to operators. Further, the device user/owner has to go to a point of sales of the operator in order to end the subscription, which is time-consuming as well as cumbersome for the user. Unless this is done, the operator might continue to bill the user for the subscription (e.g. in case of a monthly fee). The issue holds true both for a typical profile deletion (wherein one profile for a specific subscription is deleted) and a full device memory reset (wherein all profile(s), possibly from multiple operators, are deleted).

An objective of the present invention is to address and improve various aspects in view of profile deletion. A particular objective is to ensure that a profile deleted by a user is also deleted at the network side. This objective and others are achieved by the methods, devices, computer programs and computer program products according to the appended independent claims, and by the embodiments according to the dependent claims.

The objective is according to an aspect achieved by a method of ending a subscription performed in a network entity. The method comprises receiving, from a device comprising an Embedded Universal Integrated Circuit Card, eUICC, a signed confirmation of a profile having been deleted in the device, the profile being associated with a subscription for the device; sending, to a Subscription Manager Data Preparation entity, a command for deletion of the profile; and deleting the user subscription and related profile in case an acknowledgement of the deletion of the profile is received from the Subscription Manager Data Preparation entity.

The method brings about many advantages. When deleting a profile, the associated subscription is deleted from the network side and thereby ensures that any billing is ended. Further, the method frees resources at the network side and in the Subscription Manager Data Preparation entity.

The objective is according to an aspect achieved by a computer program for a network entity for ending a subscription. The computer program comprises computer program code, which, when executed on at least one processor on the network entity causes the network entity to perform the method as above.

The objective is according to an aspect achieved by a computer program product comprising a computer program as above and a computer readable means on which the computer program is stored.

The objective is according to an aspect achieved by a network entity for ending a subscription performed in. The network entity being configured to: receive, from a device comprising an Embedded Universal Integrated Circuit Card, eUICC, a signed confirmation of a profile having been deleted in the device, the profile being associated with a subscription for the device; send, to a Subscription Manager Data Preparation entity, a command for deletion of the profile; and delete the user subscription and related profile in case an acknowledgement of the deletion of the profile is received from the Subscription Manager Data Preparation.

The objective is according to an aspect achieved by a method of ending a subscription, the method being performed in a device comprising an Embedded Universal Integrated Circuit Card, eUICC. The method comprises: obtaining information on an operator providing the subscription for the device; deleting, in the device, the profile associated with the subscription for the device; and sending, to a network entity, a signed confirmation on the deletion of the profile.

The objective is according to an aspect achieved by a computer program for a device for ending a subscription. The device comprises an Embedded Universal Integrated Circuit Card, eUICC, the computer program comprising computer program code, which, when executed on at least one processor on the device, causes the device to perform the method as above.

The objective is according to an aspect achieved by a computer program product comprising a computer program as above and a computer readable means on which the computer program is stored.

The objective is according to an aspect achieved by a device comprising an Embedded Universal Integrated Circuit Card, eUICC, for ending a subscription. The device is configured to:

obtain information on an operator providing the subscription for the device, delete, in the device, the profile associated with the subscription for the device, and send, to a network entity, a signed confirmation on the deletion of the profile.

The objective is according to an aspect achieved by a method of purging a subscription. The method is performed in a Subscription Manager Data Preparation entity and comprises: receiving, from a network entity a request for deleting information related to a profile associated with a subscription for a device comprising an Embedded Universal Integrated Circuit Card, eUICC; deleting the user subscription and the information related to the profile; and sending, to the network entity, an acknowledgment of the deletion of the profile.

The objective is according to an aspect achieved by a computer program for a Subscription Manager Data Preparation entity for purging a subscription. The computer program comprises computer program code, which, when executed on at least one processor on the Subscription Manager Data Preparation entity, causes the Subscription Manager Data Preparation entity to perform the method as above.

The objective is according to an aspect achieved by a computer program product comprising a computer program as above and a computer readable means on which the computer program is stored.

The objective is according to an aspect achieved by a Subscription Manager Data Preparation entity for purging a subscription. The Subscription Manager Data Preparation entity is configured to receive, from a network entity a request for deleting information related to a profile associated with a subscription for a device comprising an Embedded Universal Integrated Circuit Card, eUICC; delete the user subscription and the information related to the profile; and send, to the network entity, an acknowledgment of the deletion of the profile.

Further features and advantages of the embodiments of the present teachings will become clear upon reading the following description and the accompanying drawings.

DETAILED DESCRIPTION

Figure 1:
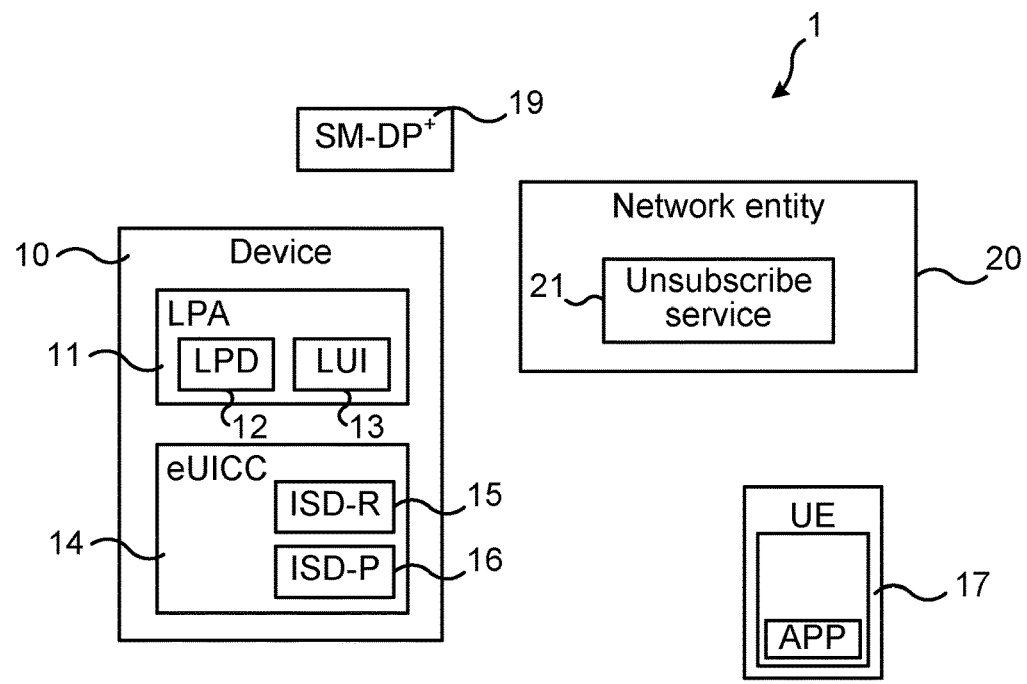
FIG. 1 illustrates an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates an environment in which embodiments according to the present teachings may be implemented.

The system 1 comprises a device 10, also denoted eUICC device herein, which in turn comprises a Local Profile Assistant (LPA) 11. The LPA 11 comprises a Local Profile Download (LPD) 12 and a Local User Interface (LUI) 13. The device 10 may, for instance, comprise a tablet, a wearable device, a smartphone, a handset etc.

The device 10 comprises an embedded universal integrated circuit (eUICC) 14, provided by a eUICC manufacturer. The device 10 is also denoted eUICC device 10 herein. The eUICC 14 may be seen as a reprogrammable SIM and is a secure hardware module typically soldered onto a circuit board. The eUICC manufacturer may, for instance, be a smart card manufacturer, a mobile network operator or device producer. A profile corresponds to a subscription to services of a network operator and typically comprises subscription related data that is stored on conventional SIM cards. On the eUICC hardware module one or more such operator profiles may be stored, each profile comprising e.g. IMSI number, Integrated Circuit Card Identifier (ICCID) and network operator name. In some embodiments, also additional information is included on the eUICC hardware module, for instance, a pointer to the network operator and/or a pointer to an unsubscribe service 21 disclosed herein.

The eUICC 14 comprises an Issuer Security Domain-Root (ISD-R) 15, which is responsible for creating new Issuer Security Domain-Profiles (ISD-Ps) and management thereof. The ISD-P 16 is a secure container (security domain) for hosting of a profile and used for profile download and installation. A profile may be stored in the ISD-P (security domain) in the eUICC 14: the security domain provides the storage and the protection and protected use of the stored data. The device 10 may be used with the eUICC 14 in order to connect to a mobile network.

The system 1 comprises a Subscription Manager Data Preparation (SM-DP) entity 19 which is an entity for creation of eSIM profiles that are later installed from the SM-DP entity 19 to the eUICC 14 of the device 10. Although the Subscription Manager Data Preparation entity 19 is exemplified by SM-DP+ in the following, it is to be understood that the Subscription Manager Data Preparation may conform to GSMA standards for either SM-DP or SM-DP+, with the addition of implementing also the methods according to the present teachings. The operator of the mobile network has access to this entity 19. The ISD-P 16 is the on-card representative of the SM-DP+ entity 19 (an ISD-P is created by the ISD-R at the request of the SM-DP+ entity 19). The SM-DP+ entity 19 binds Protected Profile Packages to the respective EID and securely downloads these Bound Profile Packages to the LPA of the respective eUICC.

The system 1 may, optionally, also comprise a device management portal for device management. The device management may be used for e.g. updating firmware of the device 10, set/change device settings such as sleep cycles and define how to handle sensor readings. The device management portal may, for instance, comprise a website or webpage published on a server and through which the user can manage his/her device(s).

A network entity 20 is provided which comprises an unsubscribe service 21. The system 1 comprises such a network entity 20. The network entity 20 may, for instance, be a server, a virtual server or a virtual machine. The unsubscribe service 21 may, for instance, be accessed by the user by means of a profile management portal. That is, the user may access (request) the unsubscribe service 21 through the user interface of the profile management portal, through which the user can select a profile to be deleted (subscription to be ended). When the user requests the unsubscribe service 21, an unsubscribe process is initiated resulting in the profile being deleted not only in the device at hand (as in prior art), but also in the mobile network (e.g. HSS thereof). As another example, the unsubscribe service 21 may be accessed (requested) through an application (also known as "mobile app", "app" and "application software") of a user device. There are thus various alternatives for accessing the unsubscribe service 21 on the network entity 20: the user may access it via a user interface of the eUICC device 10, via a user interface of a primary device or via a user interface of the profile management portal.

In some embodiments, the device management portal is configured such that it can be used also for initiating or triggering the unsubscribe process on the device 10 besides being used for the conventional device management tasks.

The system 1 may also comprise a primary device 17, which is a device that can be used for providing some capabilities to the eUICC device 10 (being a companion device), in particular for the purpose of remote SIM provisioning.

In the description, focus is on the consumer devices solution, which uses an SM-DP+ entity (while M2M devices use an SM-DP entity). The SM-DP+ entity is the newer entity of the two and likely to be the base for the merged solution aimed at by GSMA.

GSMA describes (in SGP.22 RSP Technical Specification Version 1.0 13 Jan. 2016, section 3.1) the profile download initiation process. It is described how the user orders a subscription from the operator, and how the operator asks the SM-DP+ entity to generate the matching profile. Then the operator provides the user with an activation code (AC) that the user can insert into or provide to the device to be provisioned. The device can extract the relevant information, such as SM-DP+ entity reachability information etc., from the activation code and then proceed to contact the SM-DP+ entity for downloading the profile based on the AC (after mutual authentication and various security functions).

The GSMA documents suggest that one of these eUICC devices (companion device) can also be managed through a primary device e.g. a user equipment (UE), which can provide global connectivity, for instance through WiFi tethering, to the companion device and act as the input device for entering e.g. the activation code of the companion device. SGP.22 also defines a GetEID function that can be used for retrieving the EID of the device.

The installed profiles can also be inactivated and deleted. Typically, a device only has one active profile at a time, while the rest are in inactivated state. To delete a profile, it first needs to be moved into inactivated state. The user can select to inactivate or delete a profile locally from the device or via a primary device to which the companion device is paired or via the earlier mentioned device management portal.

Figure 2:
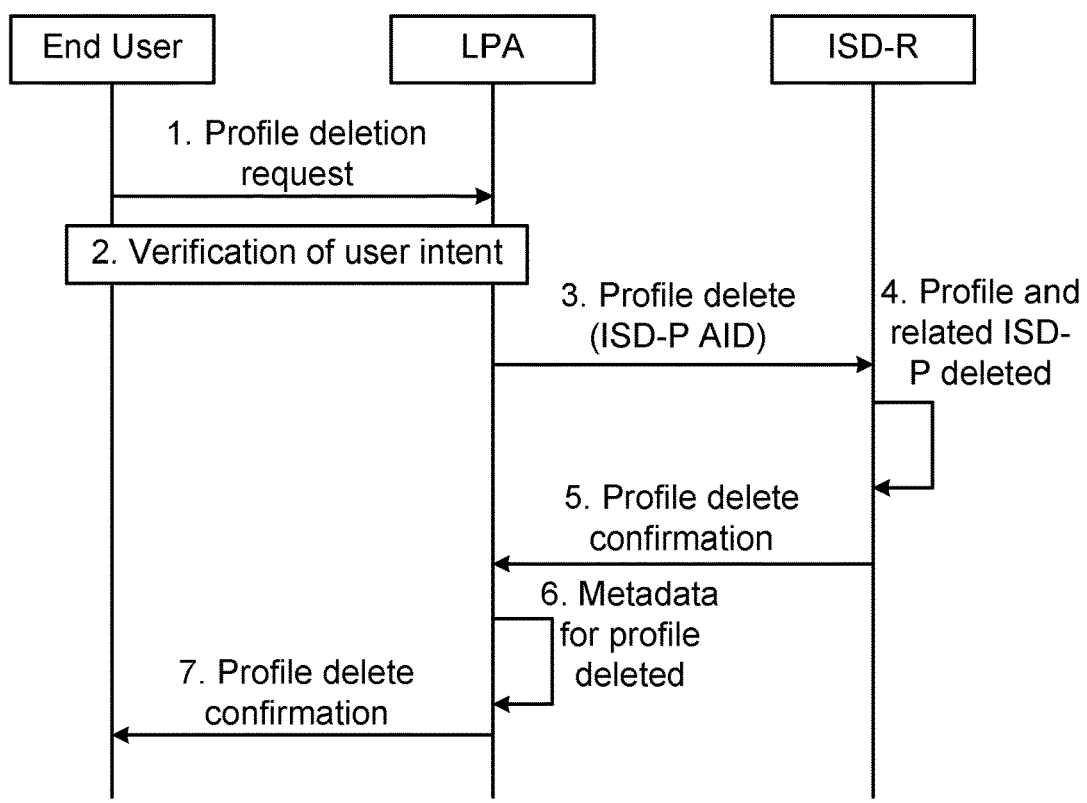
FIG. 2 is a signaling diagram showing profile deletion as defined by GSMA.

FIG. 2 is a signaling diagram showing the profile deletion in a user device defined by GSMA. The profile deletion defined by GSMA (SGP.21–RSP Technical Specification Version 1.0 23 Dec. 2015, section 5.2.3) is described briefly in the following.

At arrow 1, the user selects the profile to be deleted and selects delete using the local user interface (LUI). The LPA of the device receives the profile deletion request in the user input.

At box 2, a verification procedure may take place, wherein the end user is requested to confirm that the indicated profile is to be deleted.

At arrow 3, the LPA sends a Delete Profile command with parameters Integrated Circuit Card IDentifier (ICCID) or ISD-P application identification (ID) to the ISD-R.

At arrow 4, the ISD-R deletes the profile and related ISD-P is erased. If the profile is active, then the ISD-R first needs to inactivate the profile.

At arrow 5, the ISD-R sends a confirmation to the LPA that the profile is deleted. It is noted that in the most recent specification, this delete response from the ISD-R in eUICC only sends a single byte of '00' as a confirmation of the deletion indicating that no additional data is present for the deleted profile At arrow 6, the LPA may erase metadata for the profile. Examples of profile metadata comprises ICCID of the profile, profile name (as a plain text information: content free information defined by the Operator/Service Provider, Operator/Service Provider name, as a plain text information: content free information defined by the Service Provider), and end user profile nickname.

At arrow 7, the LPA returns an acknowledgement of profile deletion to the end user through the LUI.

From the above, it is clear that this only affects the local end user device, i.e. the device loses the subscription information. However, there are no network elements involved, so the profile will still be stored in SM-DP+ and the operator will have the matching subscription provisioned in HSS/ home Location Register (HLR). The end user thus has no means of ensuring or knowing that the subscription is indeed deleted also on the network side.

5G incorporates various devices including IoT devices. It is particularly important for IoT devices that they can be remotely managed and can operate autonomously as much as possible. When considering IoT devices that are connected with 3GPP technology, traditional SIM card based approaches are not the best option. Specifically, since change of operator and similar 3GPP subscription related activities require manual interaction with the device, the traditional SIM card approach may be cumbersome e.g. since such devices are often in remote and/or difficult to reach locations (e.g. embedded into a wall). Therefore, remotely managed 3GPP subscriptions are preferred. Even if an eSIM is currently considered for M2M devices, it is envisioned herein that they could also be considered for any type of 3GPP device in future networks such as 5G. eSIM may be seen as an evolution of the currently used subscription handling in the device, and compared to the current use of SIM cards, the eSIM is more user friendly, e.g. enabling remote provisioning.

Briefly, a modified profile delete sequence is provided that involves the network entity 20 (of the mobile network operator) and the SM-DP+ entity 19 to fully unsubscribe and purge the subscription once it is deleted from the device 10. This modified profile delete sequence frees up all the network side resources associated with the profile/subscription.

Hence, methods provided herein, in various embodiments, ensures that the deletion of a user profile is made in the eSIM device as well as in entities of the network side. Various advantages are obtained. The user is provided with a convenient and fast way to end subscriptions, without requiring a physical visit to an operator's point of sales. This is particularly valuable for a user managing many (e.g. thousands) IoT devices. On the network side, this deletion of profiles gives a resource saving. The operator may free up the IMSI of a deleted profile and use it for some other subscription, which might be valuable especially in the future IoT world where the amount of IoT devices might be an issue for the IMSI space allocated to operators. Further, the methods ensure that the user/owner of the device has indeed ended the subscription and that the operator will not continue to bill the user for the subscription.

The eUICC 14 of the eSIM device (device 10) needs to communicate with the network entity 20 (and/or SM-DP+ 19) that the profile has been deleted. In essence, this means sending the ICCID or application ID of the profile, as well as the EID to the network entity 20 (of the mobile network operator) for identifying the profile/subscription that has been deleted. In addition, the information should be cryptographically bound to the EID and at least integrity protected to protect against possible attacks and to provide authorization to delete the subscription in the MNO. This can be achieved by signing the information with the EID certificate. Credentials of the eUICC 14 are stored in eUICC Certificate Authority Security Domain (ECASD) and used by the ISD-R 15, and the signature is generated by the eUICC 14.

According to the present teachings, the mobile network operator implements a eUICC unsubscribe service 21 through which the eUICC device 10 can communicate unsubscribe requests for its installed profiles.

Figure 3:
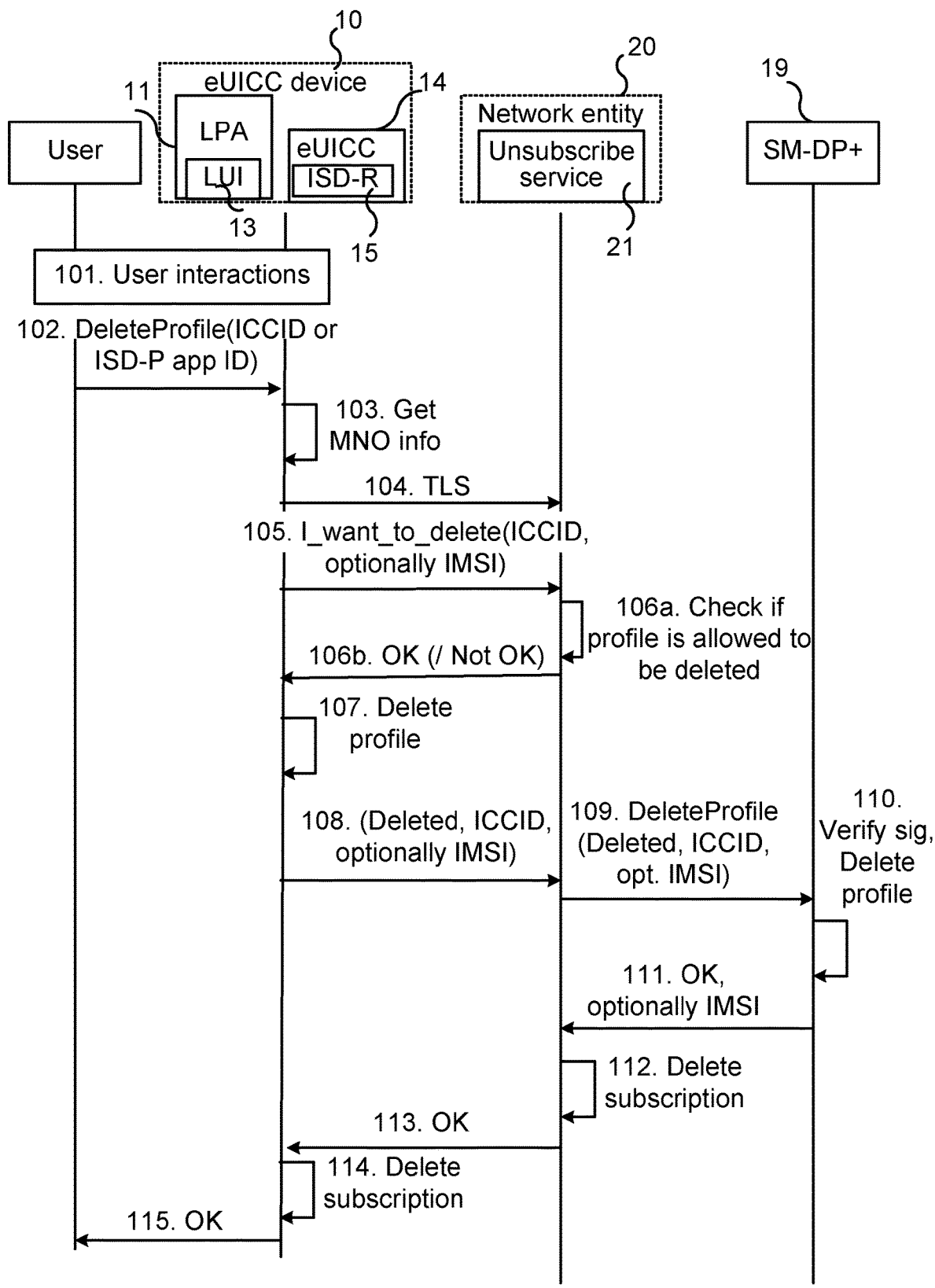
FIG. 3 is a signaling diagram showing profile deletion according to the present teachings.

FIG. 3 is a signaling diagram showing profile deletion according to the present teachings. This flow for unsubscribing a subscription is described in the following with reference to FIG. 3. Here, the references to the prior art method are to the prior art as given in GSMA SGP.22 RSP Technical Specification Version 1.0 13 Jan. 2016.

At box 101, the end-user uses a user interface that displays a list of his/hers installed profiles, with the current states (states Enabled or Disabled). The profiles may be installed within the eUICC 14 (in particular stored in the ISD-P 16 thereof) and be displayed in human readable format. The end user selects the profile to be deleted and may need to confirm his/her intention to delete the profile and acknowledge understanding the consequences. This is in accordance with prior art.

In an embodiment of the herein provided method, this delete command may optionally include an explicit indication on that the user requires a network side deletion as well. Enabling such indication may be used as a trigger for using the method according to the present teachings.

At arrow 102, in the known method, it is stated that the LPA shall call a specified function (ES10c.DeleteProfile function) of the ISD-R 15 of the eUICC 14 with its relevant input data.

In an embodiment according to the present method, this delete command may optionally also include the indication of requiring network side deletion as well.

At arrow 103, in accordance with an embodiment, the ISD-R 15 of the eUICC 14 extracts or queries information of the profile and the associated mobile network operator (i.e. the operator providing the subscription tied to the profile). In another embodiment, the LPA 11 contacts the unsubscribe service 21. The ISD-R 15 may (and should preferably) have direct access to query all relevant information about a subscription and the LPA 11 may ask the ISD-R 15 to provide the necessary information for it to contact the unsubscribe service 21. The information currently available includes the ICCID and name of the mobile network operator. In accordance with different embodiments, additional information is proposed to be available. This information may, for instance, be a pointer to the mobile network operator in the network (e.g. a Uniform Resource Locator, URL), or a direct pointer to the herein provided unsubscribe service 21 of the mobile network operator. In addition, the IMSI of the profile may be acquired.

In this context it is thus noted that the ISD-R 15 may be the entity that locally deletes a profile, but the entity that communicates with the unsubscribe service 21 may, in different embodiments, be the ISD-R 15 or the LPA 11. The entity communicating may thus, for various steps, be either the ISD-R 15 or the LPA 11.

At arrow 104, the ISD-R 15 of the eUICC 14 (or LPA 11) connects to the unsubscribe service 21 provided by the mobile network operator. The unsubscribe service 21 may be available, for instance and as has been described, through an application of a user device through which the user contacts the operator counterpart (i.e. the unsubscribe service 21 of the network entity 20) or through a portal (e.g. web portal). In FIG. 3 the unsubscribe service 21 is indicated as being provided from a mobile operator entity 20. For instance, if the subscription to be deleted is related to e.g. a smart phone then the unsubscribe service 21 of the network entity 20 may be accessed by means of an application on the smart phone. If a user has many subscriptions to delete, e.g. in case of having many IoT things, then the unsubscribe service 21 may be accessed by a portal in the form of e.g. a website on which several subscriptions can be handled in a facilitated manner, for instance as a service in a device management portal (in which the user may also manage other device functions besides the subscriptions/profiles) or in a (separate) profile management portal.

The connection between the eUICC device 10 and the unsubscribe service 21 may be secured with e.g. Transport Layer Security (TLS) using server side (mobile network operator) certificate. The eUICC 14 (i.e. client) does not need to be authenticated at this stage as that may be taken care of at a later stage by the actual delete command. The mutual authentication may, optionally, be performed based on operator and eUICC certificates.

At arrow 105, the ISD-R 15 (or LPA 11) sends a message to the unsubscribe service 21, indicating that it is about to delete the profile, and includes as profile identification information at least the ICCID, and/or the IMSI (also described in more detail later). It is noted that this is an optional step.

At arrow 106a, the unsubscribe service 21 verifies (based on information available from the mobile network operator) that the profile is allowed to be deleted and then sends, at arrow 106b, a response indicating if the eUICC device 10 may proceed with deleting the profile. There are instances wherein the profile might not be allowed to be deleted, for instance for subsidized subscriptions, or pre-installed default profiles. It is noted that this is an optional step, executed if step 105 is executed. If a negative response is received in step 106, information is shown to the user stating that the deletion is not permitted, and the delete flow is terminated.

At arrow 107, the ISD-R 15 deletes the profile and uses the EID certificate to sign the delete confirmation and the profile ID (ICCID) of the deleted profile and potentially its IMSI.

It is noted that the method may be implemented in a number of ways, and that the steps may be performed in another order than described here. For instance, if steps 105 and 106 are not used, then step 107 can be performed before step 104.

At arrow 108, the ISD-R 15 uses the established connection (e.g. TLS session) between the eUICC device 10 and the unsubscribe service 21 to send the signed delete confirmation, profile ID and optionally the IMSI, together with the EID certificate to the unsubscribe service 21. It is noted that the EID certificate is not signed, but is provided so that the receiver can verify the signature. The certificate may be sent directly, or a pointer to the certificate can be provided instead so that the peer can fetch the certificate from some other network location (e.g. database).

At arrow 109, the unsubscribe service 21 optionally (if it trusts the certificate issuer (CI) and hence has its root certificate) verifies the signature and uses for instance the EID to identify the SM-DP+ entity 19 that was used for provisioning the profile. As alternatives to using the EID, the ICCID or IMSI can be mentioned, i.e. ICCID as well as IMSI may also be used for identifying which SM-DP+ has created the profile. The unsubscribe service 21 sends a delete profile message to the SM-DP+ entity 19, together with the signed data from the ISD-R 15 of the eUICC device 10, thus letting the SM-DP+ entity 19 verify the delete request/notification.

At arrow 110, the SM-DP+ entity 19 verifies the delete command and then deletes the profile and related information (if any) from its database(s). The SM-DP+ entity 19 verifies the signature and thus the identity of the eUICC device 10 and verifies that that specific device 10 has deleted the identified (based on ICCID or IMSI) profile, i.e. if it can be shown that the message is signed with the private key of the eUICC 14 then that eUICC 14 is the one that has deleted the profile.

At arrow 111, the SM-DP+ entity 19 returns an acknowledgement of successful deletion to the unsubscribe service 21, possibly together with the IMSI associated with the profile that was deleted. In case the signed delete command was not valid then an error message is returned to the unsubscribe service 21.

At arrow 112, the unsubscribe service 21 deletes the subscription from database(s) of the mobile network operator. The subscription may be identified by the ICCID received from eUICC device 10 in the delete confirmation, by the IMSI received from the eUICC 14 or by the IMSI received from SM-DP+ entity 19.

At arrow 113, the unsubscribe service 21 sends an acknowledgement to the ISD-R 15 of the eUICC device 10.

At arrow 114, the ISD-R 15 returns a response to the LPA 11 indicating that the result was OK. This is required also in the GSMA prior art. Further, as indicated at arrow 115, this might result in some acknowledgement information being displayed to the user, this acknowledgement ensuring the user that the subscription has been deleted also on the network side.

Here steps 101, 102 and 112 are, as have been indicated, similar to the steps according to the GSMA specification, and the remaining steps implement the method, in various embodiments, according to the present teachings.

In step 101, the user interacts with the eUICC device 10 either through a user interface on the eUICC device 10 or a user interface of a primary device connected to the eUICC device 10. This is also according to the GSMA specification. In order to be more usable also in IoT scenarios, where a user might control a lot of devices deployed at different and sometimes hard to reach locations (e.g. embedded inside other machinery), the role of the primary device could also be taken by a management portal of the IoT devices (comprising an eUICC). The IoT devices may also be managed through the device management portal, e.g. modifying settings such as sleep cycle lengths. This requires that there is a trust relationship between the IoT device (eUICC thereof) and the management portal, and also that the communication between the two can be protected. Thus, this management interface may also be used as the interface of a primary device for accessing the LUI/LPA services on the IoT device.

Regarding step 103, new requirements for the eUICC 14 may be introduced according to the present teachings. Firstly, more information about the mobile network operator providing the profile may be needed. At least a pointer to a web service or a lookup service could be required (and provided), but a direct link to the unsubscribe service 21 is more preferable. This information may be made part of the profile metadata or the ISD-R 15 may query it from the profile. A further advantage is provided if also the public key certificate of the mobile network operator is retrieved, since the mobile network operator TLS session may then be properly authenticated.

In other embodiments, the mobile network operator information may be obtained from the eUICC 14 by letting the user input the URL of the unsubscribe service 21 through the LUI 13 (e.g. an URL such as: http://www.mobile_network_operator_name.se/unsubscribe). The need for the mobile network operator certificate is not as crucial; in the worst case, if the contacted mobile network operator is actually a malicious party instead of the actual mobile network operator, the subscription will not be deleted from the network entity 20 of the mobile network operator nor from the SM-DP+ entity 19, which may lead to the monthly fee being billed to the owner even if he thinks the subscription has been deleted or the user receiving a message denying deletion, whereby the user may take appropriate action. However, the subscription will be deleted from eUICC 14 and no traffic will be generated. In addition, the ISD-R 15 may include a challenge for the SM-DP+ entity 19 to verify that the SM-DP+ entity 19 has deleted all information related to the profile. The SM-DP+ entity 19 signs the answer to the challenge with the certificate issued by the certificate issuer (CI), which the ISD-R 15 can then verify. The challenge may, for instance, be as simple as sending a nonce in the delete command to the mobile network operator, which would be forwarded to the SM-DP+ entity 19. The SM-DP+ entity 19 would then just sign the nonce and echo it back to the eUICC 14. This additional verification makes sure that an attacker can not later re-use the access code in order to re-retrieve the profile from SM-DP+ entity 19. Since the delete confirmation has reached the SM-DP+ entity 19, and it has acknowledged the deletion, it is ensured that the delete was not intercepted by a malicious entity. Without such verification, there is no way of knowing if the profile has actually been deleted from SM-DP+ entity 19 and hence there is the possibility that the profile is still available at the SM-DP+ entity 19 and it can be re-downloaded with the activation code.

The last new requirement mentioned in relation to step 103 is that the ISD-R 15 can acquire the IMSI of the profile. This is needed so that the mobile network operator can identify the subscription to be deleted. For conventional SIM devices, i.e. non-eSIM devices, the mobile network operator is typically not concerned with the ICCID so it cannot be used for finding the associated subscription. If the mobile network operator has a mapping from the ICCID (or EID if there is only one subscription for the EID) to the subscription, the IMSI is not needed in the delete request. In addition to relying on a mapping from ICCID (or EID) to the subscription, there is another alternative that does not require the ISD-R to acquire the IMSI of the profile. In particular, assuming that the SM-DP+ entity 19 stores the profile information of all profiles it has provisioned until they are deleted, the mobile network operator can use the SM-DP+ entity 19 for identifying the IMSI associated with the ICCID or EID. When the mobile network operator requests the SM-DP+ entity 19 to delete the profile identified by the ICCID and EID, the SM-DP+ entity 19 can in a return OK-message include the IMSI that was part of the profile. The SM-DP+ entity 19 creates the profile and thus has all information available: ICCID, EID, IMSI, Ki etc.

Regarding step 107, one of finding the correct SM-DP+ entity 19 may be based on the received ICCID or the subscription IMSI. Depending on how the mobile network operator stores the subscription and eUICC related information, that information can be used for mapping to the SM-DP+ entity 19 that was used for provisioning the eUICC device 10. The mobile network operator may use the suitable information to locate the associated SM-DP+ information.

As noted earlier, the different steps described may be performed in a different order than the above presented. For instance, step 112 may be performed before step 109 if the mobile network operator can identify the subscription on its own (without contacting the SM-DP+ entity 19).

In case the delete request reaching the mobile network operator does not match an existing subscription, the mobile network operator can answer with either an acknowledgement message as in a successful delete message or it can indicate that no such subscription was available for deletion. Since it is assumed that the profile in the eUICC 14 of the eUICC device 10 is always mapped to its actual mobile network operator, there should never be the case that the delete command is sent to the wrong mobile network operator (i.e. there is a one-to-one mapping between the profile and the mobile network operator). Thus, the delete acknowledgement from the mobile network operator basically just tells the eUICC 14 that the subscription has been deleted at the mobile network operator. Thus, if no matching subscription is found, a plain "OK" as in a regular scenario is suitable as it just indicates that from this point onwards the mobile network operator does not have the subscription in its system (and might never have had).

An alternative is to send a signal back to the eUICC device 10 indicating explicitly that no such subscription exists. This information can be displayed to the user if there is a suitable user interface. This may be valuable if the mobile network operator has deleted the subscription on its own (e.g. due to bill not being paid, long time without any action on the subscription or pre-paid subscription that has run out of credits) and wants the user to know this through the delete process.

Similarly, the SM-DP+ entity 19 might not have any information stored any longer for the profile to be deleted. The SM-DP+ entity 19 may, for example, purge its database of successfully provisioned profiles after some timeout period. The main purpose of the signaling between network entity 20 and the SM-DP+ entity 19 in this delete process is to make sure that the SM-DP+ entity 19 has deleted any information related to the profile indicated by the MNO. Thus, the SM-DP+ entity 19 can return an "OK" even if there was no longer any information to delete for the profile. The "OK" only indicates that it no longer stores any information related to the profile.

The various embodiments and features that have been described may be combined in many different ways, further examples of which are given in the following with reference first to FIG. 4.

Figure 4:
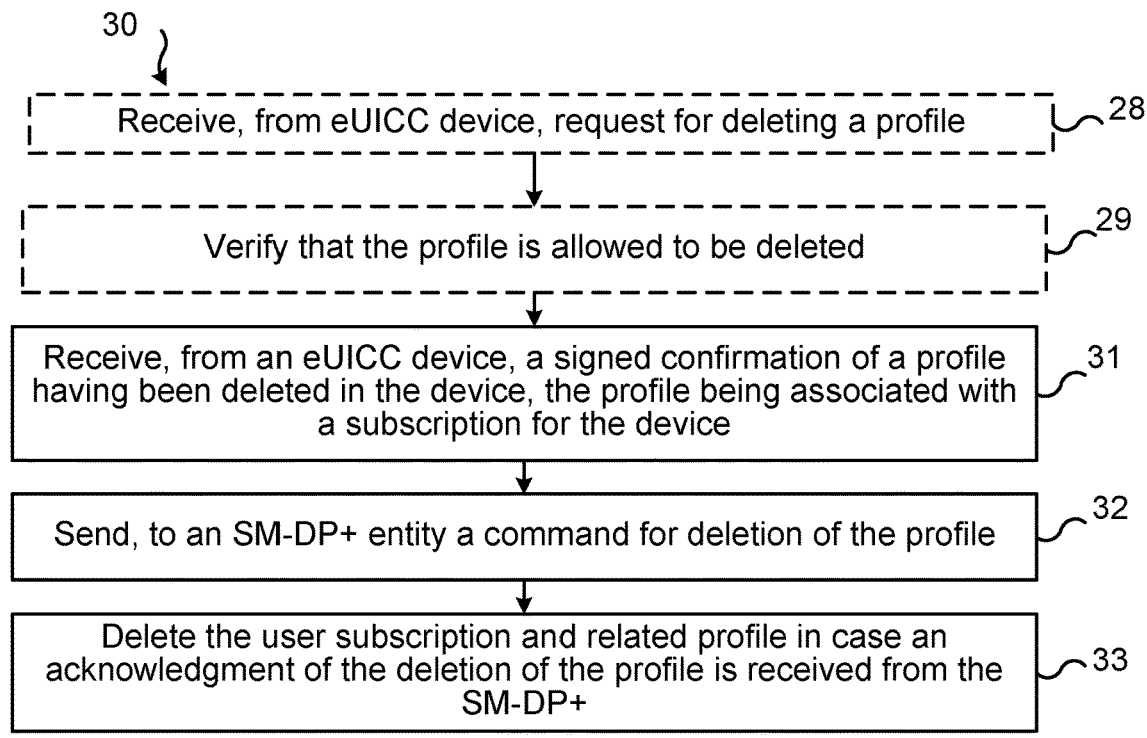
FIG. 4 illustrates a flow chart over steps of an embodiment of a method in a network entity in accordance with the present teachings.

FIG. 4 illustrates a flow chart over steps of an embodiment of a method in a network entity in accordance with the present teachings. The method 30 of ending a subscription may be performed in a network entity 20.

The method 30 comprises receiving 31, from a device 10 comprising an Embedded Universal Integrated Circuit Card, eUICC, 14 (also denoted eUICC device 10), a signed confirmation of a profile having been deleted in the device 10, the profile being associated with a subscription for the device 10. An ISD-R 15 of the eUICC 14 may use an established connection (e.g. TLS session) between the eUICC device 10 and an unsubscribe service 21 of the network entity 20 to send the signed delete confirmation. The signed delete confirmation may comprise a profile ID of the deleted profile and optionally the IMSI, together with the EID certificate. This signed confirmation was exemplified with reference to FIG. 3, at arrow 108, and described in the related description.

The method 30 comprises sending 32, to a Subscription Manager Data Preparation entity 19, a command for deletion of the profile. This has been exemplified in relation to FIG. 3, at arrow 109.

The method 30 comprises the step of deleting 33 the user subscription and related profile in case an acknowledgement of the deletion of the profile is received from the Subscription Manager Data Preparation entity. That is, upon receiving, from the Subscription Manager Data Preparation entity 19, an acknowledgment of the deletion of the profile, the network entity 20 deletes the user subscription and related profile. This has been exemplified with reference to FIG. 3, at arrow 112. It is noted that the method 30 may comprise the step of verifying the signature if the network entity 20 trusts the certificate issuer before deleting the user subscription and related profile.

The method 30 may be implemented as a sequence of instructions executed by the network entity 20. The described unsubscribe service 21 may comprise such sequence of instructions. The network entity may, for instance, be a server, a virtual server, or a virtual machine as described earlier.

The delete confirmation is generated by the eUICC 14 of the device 10, but there are several options for the path over which this delete confirmation travels from the device 10 to the network entity 20. For instance, the network entity 2o may receive the delete confirmation directly from the device 10 comprising the eUICC 14. In case of a primary device being involved, the primary device may typically just provide connectivity, but the delete confirmation message would be sent from the eUICC device 10 to the unsubscribe service 21. The device (or profile) management portal described earlier may be used for triggering the unsubscribe operation, but the actual communication between eUICC 14 and operator would typically be initiated from ISD-R 15 or the LPA 11 of the eUICC 14.

In an embodiment, the method 30 comprises prior to the receiving 31 from the device 10 the signed confirmation of the profile being deleted in the device 10:

receiving 28, from the device 10 comprising the eUICC 14, a request for deleting a profile associated with a subscription for the device 10 comprising the eUICC 14, and verifying 29 that the profile is allowed to be deleted.

The above steps 28, 29 are optional, which is indicated by the boxes being drawn with dashed lines.

There are several option for the path over which the request travels from the device 10 to the network entity 20. For instance, the request may be received directly from the device 10 comprising the eUICC 14, or it may be received via a management portal 16 connected to or on behalf of the device 10 comprising the eUICC 14, or it may be received via a primary device 17 connected to the device 10 comprising the eUICC 14.

In variations of the above embodiments, the method 30 comprises transmitting a response to the device 10 indicating that the profile is allowed to be deleted. It may not always be the case that a profile is allowed to be deleted. This may, for instance, be the case for subsidized subscriptions or pre-installed default profiles.

In various embodiments, the command for deletion of the profile further comprises deletion also of information related to the profile, such as, for instance, metadata of the profile (exemplified earlier).

In various embodiments, the sending 32 to the Subscription Manager Data Preparation entity 19 the command for deletion of the profile is preceded by identifying the Subscription Manager Data Preparation by using an identification of the eUICC 14 received from the device 10 in the signed confirmation.

In a variation of the above embodiment, the identifying the Subscription Manager Data Preparation comprises using the identification of the eUICC 14 and the profile to be deleted.

In various embodiments, the method 30 comprises, after the deleting 33 the user subscription and related profile, sending an acknowledgment to the device 10 on the subscription and profile related information having been deleted.

Figure 5:
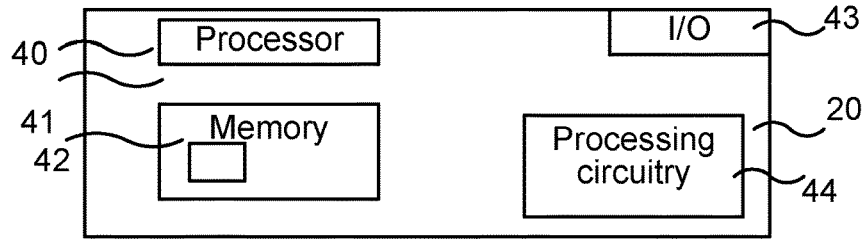
FIG. 5 illustrates schematically a network entity and means for implementing embodiments of the method in accordance with the present teachings.

FIG. 5 illustrates schematically a network entity and means for implementing embodiments of the method in accordance with the present teachings.

The network entity 20 comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be or form part of a computer program product. The processor 40 can be configured to execute any of the various embodiments of the method 30 for instance as described in relation to FIG. 4.

The memory 41 of the network entity 20 can be any combination of read and write memory (RAM) and read only memory (ROM), Flash memory, magnetic tape, Compact Disc (CD)-ROM, digital versatile disc (DVD), Blu-ray disc etc. The memory 41 may also comprise persistent storage, which, for example, can be any single one or combination of magnetic memory, optical memory, solid state memory or even remotely mounted memory.

The network entity 20 may comprise an interface 43 for communication with other devices and/or entities. The interface 43 may, for instance, comprise a protocol stack, for communication with other devices or entities. The interface may be used for receiving data input and for outputting data.

The network entity 20 may comprise additional processing circuitry, schematically indicated at reference numerals 44 for implementing the various embodiments according to the present teachings.

A network entity 20 is provided for ending a subscription. The network entity 20 is configured to:

receive, from a device 10 comprising an Embedded Universal Integrated Circuit Card, eUICC, 14, a signed confirmation of a profile having been deleted in the device 10, the profile being associated with a subscription for the device 10, send, to a Subscription Manager Data Preparation entity 19, a command for deletion of the profile, and delete the user subscription and related profile in case an acknowledgement of the deletion of the profile is received from the Subscription Manager Data Preparation entity 19.

The network entity 20 may be configured to perform the above steps e.g. by comprising one or more processors 40 and memory 41, the memory 41 containing instructions executable by the processor 40, whereby the network entity 20 is operative to perform the steps. That is, in an embodiment, a network entity 20 is provided for ending a subscription. The network entity 20 comprises one or more processors 40 and memory 41, the memory 41 containing instructions executable by the processor 40, whereby the network entity 20 is operative to: receive, from a device comprising an Embedded Universal Integrated Circuit Card, eUICC, a signed confirmation of a profile having been deleted in the device, the profile being associated with a subscription for the device; send, to a Subscription Manager Data Preparation entity, a command for deletion of the profile; and delete the user subscription and related profile in case an acknowledgement of the deletion of the profile is received from the Subscription Manager Data Preparation entity.

In an embodiment, the network entity 20 is configured to, prior to the receiving 31 from the device 10 the signed confirmation of the profile being deleted in the device 10:

receive, from the device 10 comprising the eUICC 14, a request for deleting a profile associated with a subscription for the device 10 comprising the eUICC 14, and verify that the profile is allowed to be deleted.

In an embodiment, the network entity 20 is configured to transmit a response to the device 10 indicating that the profile is allowed to be deleted.

In an embodiment, the command for deletion of the profile further comprises deletion also of information related to the profile.

In an embodiment, the network entity 20 is configured to, prior to the sending to the Subscription Manager Data Preparation entity 19 the command for deletion of the profile, identify the Subscription Manager Data Preparation entity 19 by using an identification of the eUICC 14 received from the device 10 in the signed confirmation.

In another embodiment, the Subscription Manager Data Preparation entity 19 may itself purge all profile related data once the profile has been provisioned to an eUICC 14. In this case, the eUICC 14 would send the delete confirmation message to the operator (i.e. to the unsubscribe service 21), which would verify the signature, identify the subscription and delete the subscription and then acknowledge the deletion to the eUICC device 10.

In an embodiment, the network entity 20 is configured to identify the Subscription Manager Data Preparation entity 19 by using the identification of the eUICC 14 and the profile to be deleted.

In an embodiment, the network entity 20 is configured to, after the deleting the user subscription and related profile, send an acknowledgment to the device 10 on the subscription and profile related information having been deleted.

The present teachings also encompass a computer program 42 for a network entity 20 for ending a subscription. The computer program 42 comprises computer program code, which, when executed on at least one processor on the network entity 20, causes the network entity 20 to perform the method 30 according to any of the described embodiments.

The present teachings also encompass computer program products 41 for a network entity 20. The computer program product 41 comprises the computer program 42 for implementing the embodiments of the methods as described, and a computer readable means on which the computer program 42 is stored. The computer program product, or the memory, thus comprises instructions executable by the processor 40. Such instructions may be comprised in a computer program, or in one or more software modules or function modules. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 6:
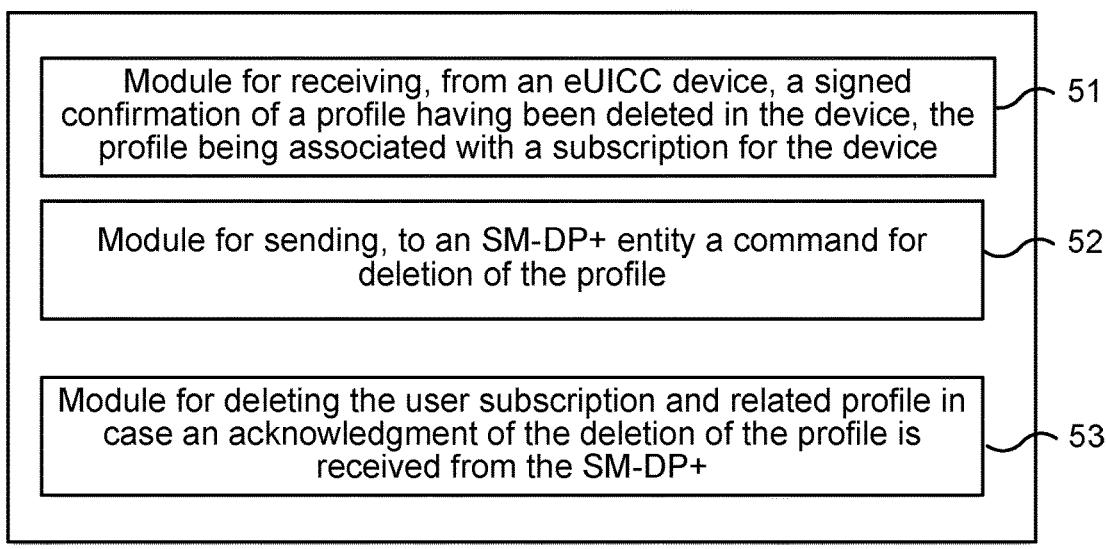
FIG. 6 illustrates a network entity comprising function modules/software modules for implementing embodiments of the present teachings.

FIG. 6 illustrates a network entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described in various embodiments.

A network entity is provided for ending a subscription. The network entity comprises a first module 51 for receiving, from a device comprising an Embedded Universal Integrated Circuit Card, eUICC, a signed confirmation of a profile having been deleted in the device, the profile being associated with a subscription for the device. Such first module 51 may, for instance, comprise receiving circuitry or an input device.

The network entity comprises a second module 52 for sending, to a Subscription Manager Data Preparation entity 19, a command for deletion of the profile. Such second module 52 may, for instance, comprise transmitting circuitry or an output device.

The network entity comprises a third module 53 for deleting the user subscription and related profile in case an acknowledgement of the deletion of the profile is received from the Subscription Manager Data Preparation. Such third module 53 may, for instance, comprise processing circuitry adapted for deleting profiles.

It is noted that one or more of the modules 51, 52, 53 may be replaced by units.

Figure 7:
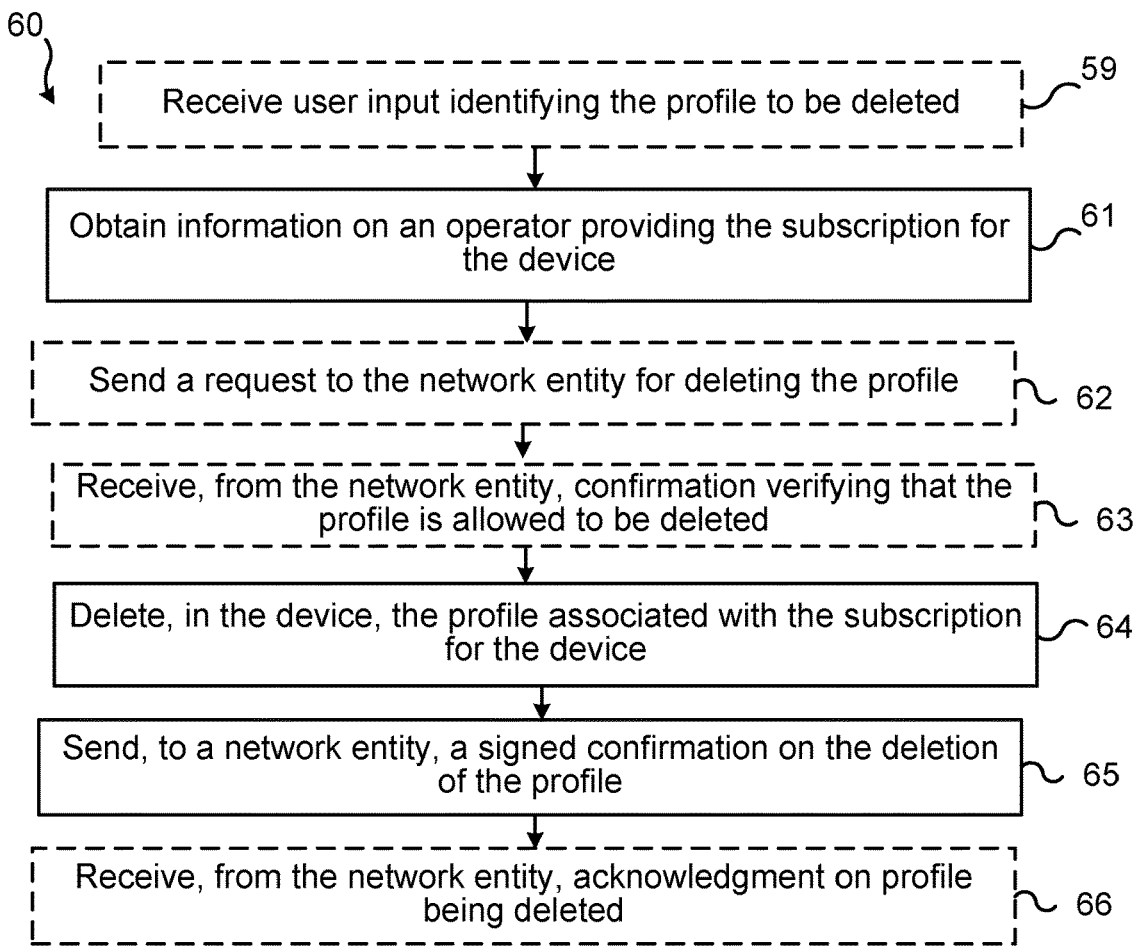
FIG. 7 illustrates a flow chart over steps of an embodiment of a method in a user device in accordance with the present teachings.

FIG. 7 illustrates a flow chart over steps of an embodiment of a method in a user device in accordance with the present teachings. The method 60 of ending a subscription may be performed in a device 10 comprising an Embedded Universal Integrated Circuit Card, eUICC, 14. The device 10 may, for instance, comprise a tablet, a wearable device, a smartphone, a handset etc. as has been described e.g. in relation to FIG. 1.

The method 60 comprises obtaining 61 information on an operator providing the subscription for the device 10. Examples on the information on the operator comprise a pointer (e.g. an URL) to the operator and a pointer to an unsubscribe service provided by the operator.

The method 60 comprises deleting 64, in the device 10, the profile associated with the subscription for the device 10.

The method 60 comprises sending 65, to a network entity 20, a signed confirmation on the deletion of the profile. The signed delete confirmation may comprise a profile ID of the deleted profile and optionally the IMSI, together with the EID certificate. This signed confirmation was exemplified with reference to FIG. 3, at arrow 108, and described in the related description.

The method 60 provides various advantages. For instance, the user is provided with an easy way of ensuring that a subscription is indeed ended, and the user can rest assure that any billing related to the subscription can be expected. The provided modified profile delete sequence involves the mobile network operator and the Subscription Manager Data Preparation entity, which are used to fully unsubscribe and purge the subscription once it is deleted from the device. This in turn, frees all the network side resources associated with the profile/subscription and the method 60 is hence also advantageous for the mobile network operator.

In an embodiment, the method 60 comprises, prior to the obtaining 61, receiving 59 a user input identifying the profile to be deleted. This step is optional, as indicated by the box drawn with dashed line.

The user input may be given in different ways. One option is that the device 10 comprises a user interface through which the user communicates his/her desire to end a subscription. If the device 10 does not have such user interface, e.g. in case the device 10 is an IoT device, the user interface of a primary device may instead be used. Still another option is to have a device management portal comprising e.g. a website or the like through which the user may be able to manage a large number of devices.

In various embodiments, the sending 65 the signed confirmation comprises:

obtaining, within the device 10, an identification of the eUICC 14 and an identification of the profile, signing the confirmation using the identification of the eUICC 14, and sending the signed confirmation.

It is noted that, in the above signing, the identity of the profile may also be signed. That is, the delete confirmation and identity of profile that was deleted may be signed together to form the full delete confirmation.

The confirmation on the deletion having been made may comprise a confirmation of a successful delete, a target of the deletion, i.e. a profile identifier such as, for instance, ICCID. The confirmation on the deletion may optionally also comprise IMSI or some other subscription identifier. It is noted that a profile identifier may also be seen as a subscription identifier.

In an embodiment, the method 60 comprises receiving 66, from the network entity 20, an acknowledgment on the profile being deleted. This acknowledgment may, for instance, be displayed e.g. on a display in a human readable form so that the user gets the confirmation that the subscription has been ended. This step is optional, as indicated by the box drawn with dashed line.

In various embodiments, the method 60 comprises, prior to the deleting 64:

sending 62, based on the obtained information on the operator, a request to the network entity 20 for deleting the profile associated with the subscription for the device 10, and receiving 63, from the network entity 20, a confirmation verifying that the profile is allowed to be deleted.

It is noted that the request for deleting the profile may, but need not, be a signed request. It is also noted that these steps are optional, as indicated by the boxes drawn with dashed lines.

In various embodiments, the information on the operator associated with the profile comprises one or more of: name of the operator, a pointer to the operator, a pointer to the operator comprising a Uniform Resource Locator, URL, and an International Mobile Subscriber Identity, IMSI, of the profile.

The operator may be identified based on various type of information, as exemplified here. The IMSI is an identifier for the profile/subscription, but its syntax is such that it contains e.g. a country code and an operator code. Based on this, the operator may be identified.

The signed request may be sent 62 in different ways. For instance, the sending 62 may comprises one of:

sending the request directly from the device 10 comprising the eUICC 14, or sending the request via a management portal 16 connected to the device 10 comprising the eUICC 14, or via the management portal 16 on behalf of the device 10, or sending the request via a primary device 17 connected to the device 10 comprising the eUICC 14.

The sending 65, to a network entity 20, a signed confirmation on the deletion of the profile may also be made in different ways. For instance, the sending 65 may comprise one of:

sending the signed confirmation directly from the device 10 comprising the eUICC 14, sending the signed confirmation via a management portal 16 connected to the device 10 comprising the eUICC 14, or via the management portal 16 on behalf of the device 10, or sending the signed confirmation via a primary device 17 connected to the device 10 comprising the eUICC (14).

Figure 8:
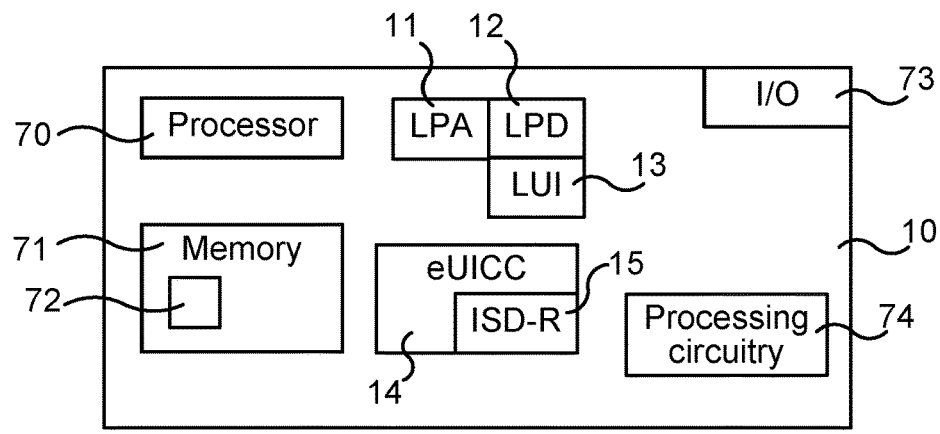
FIG. 8 illustrates schematically a user device and means for implementing embodiments of the method in accordance with the present teachings.

FIG. 8 illustrates schematically a device, in particular a user device, and means for implementing embodiments of the method in accordance with the present teachings.

The device 10 comprises a processor 70 comprising any combination of one or more of a central processing unit (CPU), multiprocessor, microcontroller, digital signal processor (DSP), application specific integrated circuit etc. capable of executing software instructions stored in a memory 71 which can thus be or form part of a computer program product. The processor 70 can be configured to execute any of the various embodiments of the method 60 for instance as described in relation to FIG. 7.

The memory 71 of the device 10 can be any combination of read and write memory (RAM) and read only memory (ROM), Flash memory, magnetic tape, Compact Disc (CD)-ROM, digital versatile disc (DVD), Blu-ray disc etc. The memory 71 may also comprise persistent storage, which, for example, can be any single one or combination of magnetic memory, optical memory, solid state memory or even remotely mounted memory.

The device 10 may comprise an interface 73 for communication with other devices and/or entities. The interface 73 may, for instance, comprise a protocol stack, for communication with other devices or entities. The interface may be used for receiving data input and for outputting data and may also comprise a user interface.

The device 10 may comprise additional processing circuitry, schematically indicated at reference numerals 74 for implementing the various embodiments according to the present teachings.

The device 10 may further comprise the earlier described LPA 11, LPD 12, LUI 13, eUICC 14 with the ISD-R 15.

A device 10 comprising an Embedded Universal Integrated Circuit Card, eUICC, 14, is provided for ending a subscription. The device 10 is configured to:

obtain information on an operator providing the subscription for the device 10, delete, in the device 10, the profile associated with the subscription for the device 10, and send, to a network entity 20, a signed confirmation on the deletion of the profile.

The device 10 may be configured to perform the above steps e.g. by comprising one or more processors 70 and memory 71, the memory 71 containing instructions executable by the processor 70, whereby the device 10 is operative to perform the steps. That is, in an embodiment, a device 10 is provided for ending a subscription. The device 10 comprises one or more processors and memory, the memory containing instructions executable by the processor, whereby the device 10 is operative to: obtain information on an operator providing the subscription for the device, delete, in the device, the profile associated with the subscription for the device, and send, to a network entity, a signed confirmation on the deletion of the profile.

In an embodiment, the device 10 is configured to, prior to the obtaining, receive a user input identifying the profile to be deleted.

In an embodiment, the device 10 is configured to receive, from the network entity 20, an acknowledgment on the profile being deleted.

In some embodiments, the device 10 is configured to sending the signed confirmation by:

obtaining, within the device 10, an identification of the eUICC 14 and an identification of the profile, signing the confirmation using the identification of the eUICC 14, and sending the signed confirmation.

In an embodiment, the device 10 is configured to, prior to the deleting:

send, based on the obtained information on the operator, a request to the network entity 20 for deleting the profile associated with the subscription for the device 10, and receive, from the network entity 20, a confirmation verifying that the profile is allowed to be deleted.

In various embodiments, the information on the operator associated with the profile comprises one or more of: name of the operator, a pointer to the operator, a pointer to the operator comprising a Uniform Resource Locator, URL, and an International Mobile Subscriber Identity, IMSI, of the profile.

The present teachings also encompass a computer program 72 for a device 10 for ending a subscription. The computer program 72 comprises computer program code, which, when executed on at least one processor on the device 10, causes the device 10 to perform the method 60 according to any of the described embodiments.

The present teachings also encompass computer program products 71 for a device 10. The computer program product 71 comprises the computer program 72 for implementing the embodiments of the methods as described, and a computer readable means on which the computer program 72 is stored. The computer program product, or the memory, thus comprises instructions executable by the processor 70. Such instructions may be comprised in a computer program, or in one or more software modules or function modules. The computer program product 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 9:
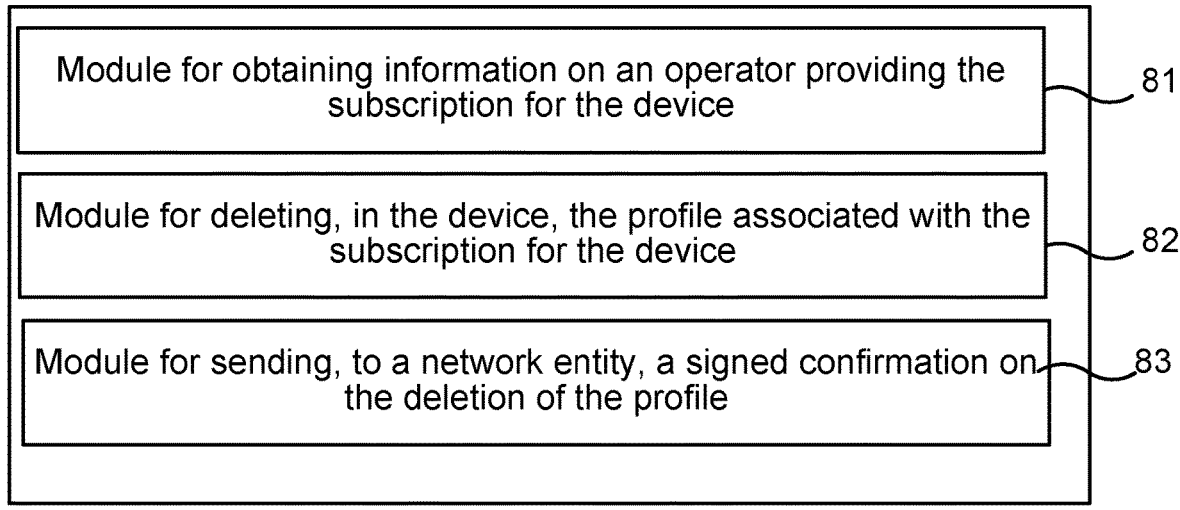
FIG. 9 illustrates a user device comprising function modules/software modules for implementing embodiments of the present teachings.

FIG. 9 illustrates a user device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 60 that has been described in various embodiments.

A device comprising an Embedded Universal Integrated Circuit Card, eUICC, is provided for ending a subscription. The device 10 comprises a first module 81 for obtaining information on an operator providing the subscription for the device. Such first module 81 may, for instance, comprise receiving circuitry or an input device.

The device 10 comprises a second module 82 for deleting, in the device, the profile associated with the subscription for the device. Such second module 82 may, for instance, comprise processing circuitry adapted for deleting profiles.

The device 10 comprises a third module 83 for sending, to a network entity, a signed confirmation on the deletion of the profile. Such third module 83 may, for instance, comprise transmitting circuitry or an output device.

It is noted that one or more of the modules 81, 82, 83 may be replaced by units.

Figure 10:
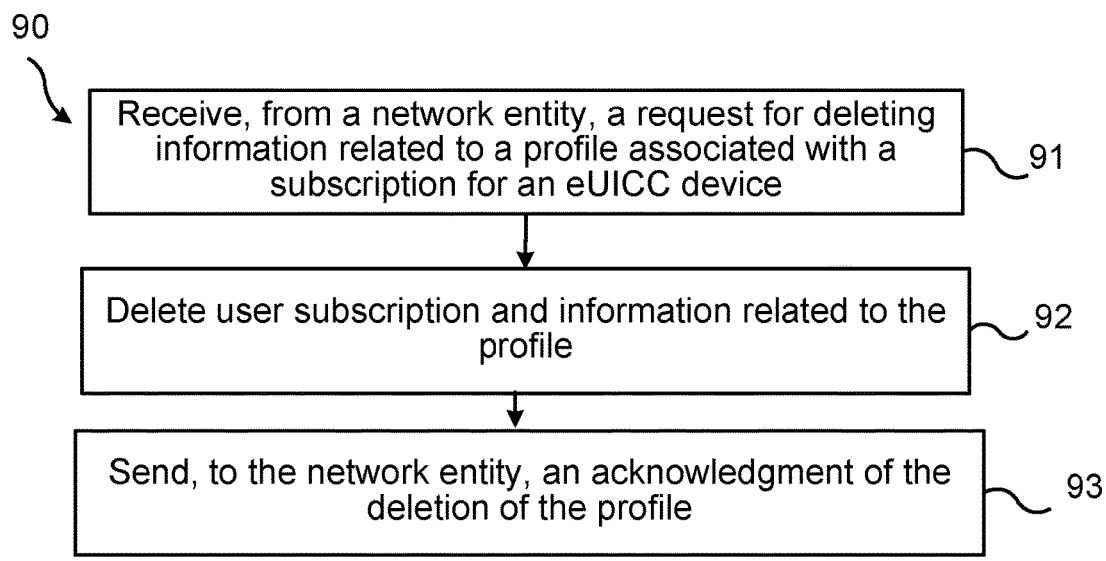
FIG. 10 illustrates a flow chart over steps of an embodiment of a method in a Subscription Manager Data Preparation entity in accordance with the present teachings.

FIG. 10 illustrates a flow chart over steps of an embodiment of a method in a Subscription Manager Data Preparation entity in accordance with the present teachings. The method 90 of purging a subscription may be performed in a Subscription Manager Data Preparation entity 19. The Subscription Manager Data Preparation entity 19 may be configured to perform functions as defined in GSMA SGP.21— RSP Technical Specification Version 1.0 23 Dec. 2015, section 5.2.3 and/or in SGP.22 RSP Technical Specification Version 1.0 13 Jan. 2016, section 3.1, with the addition of the method 90 as described herein.

The method 90 comprises receiving 91, from a network entity 20 a request for deleting information related to a profile associated with a subscription for a device 10 comprising an Embedded Universal Integrated Circuit Card, eUICC, 14.

The method 90 comprises deleting 92 the user subscription and the information related to the profile.

The method 90 comprises sending 93, to the network entity 20, an acknowledgment of the deletion of the profile.

In an embodiment, the request for deleting the profile comprises data signed by the device 10. The Subscription Manager Data Preparation entity 19 may verify the signature before deleting the profile.

Figure 11:
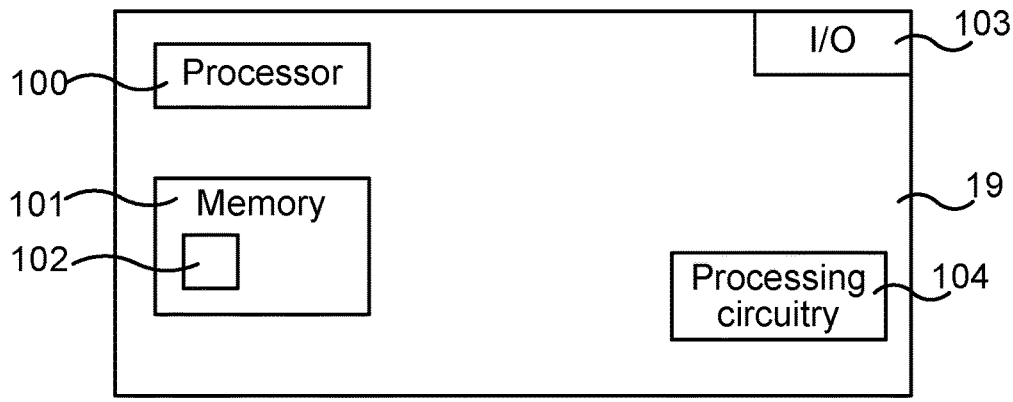
FIG. 11 illustrates schematically a Subscription Manager Data Preparation entity and means for implementing embodiments of the method in accordance with the present teachings.

FIG. 11 illustrates schematically a Subscription Manager Data Preparation entity and means for implementing embodiments of the method in accordance with the present teachings.

The Subscription Manager Data Preparation entity 19 comprises a processor 100 comprising any combination of one or more of a central processing unit (CPU), multiprocessor, microcontroller, digital signal processor (DSP), application specific integrated circuit etc. capable of executing software instructions stored in a memory 91 which can thus be or form part of a computer program product. The processor 90 can be configured to execute any of the various embodiments of the method 90 for instance as described in relation to FIG. 10.

The memory 91 of the Subscription Manager Data Preparation entity 19 can be any combination of read and write memory (RAM) and read only memory (ROM), Flash memory, magnetic tape, Compact Disc (CD)-ROM, digital versatile disc (DVD), Blu-ray disc etc. The memory 91 may also comprise persistent storage, which, for example, can be any single one or combination of magnetic memory, optical memory, solid state memory or even remotely mounted memory.

The Subscription Manager Data Preparation entity 19 may comprise an interface 103 for communication with other devices and/or entities. The interface 103 may, for instance, comprise a protocol stack, for communication with other devices or entities. The interface may be used for receiving data input and for outputting data.

The Subscription Manager Data Preparation entity 19 may comprise additional processing circuitry, schematically indicated at reference numerals 104 for implementing the various embodiments according to the present teachings.

A Subscription Manager Data Preparation, SM-PD, entity 19 is provided for purging a subscription. The SM-PD entity 19 is configured to:

receive, from a network entity 20 a request for deleting information related to a profile associated with a subscription for a device 10 comprising an Embedded Universal Integrated Circuit Card, eUICC, 14, deleting 92 the user subscription and the information related to the profile, and sending 93, to the network entity 20, an acknowledgment of the deletion of the profile.

The SM-PD entity 19 may be configured to perform the above steps e.g. by comprising one or more processors 100 and memory 101, the memory 101 containing instructions executable by the processor 100, whereby the SM-PD entity 19 is operative to perform the steps. That is, in an embodiment, a SM-PD entity 19 is provided for purging a subscription. The SM-PD entity 19 comprises one or more processors 100 and memory 101, the memory 101 containing instructions executable by the processor 100, whereby the SM-PD entity 19 is operative to: receive, from a network entity a request for deleting information related to a profile associated with a subscription for a device 10 comprising an Embedded Universal Integrated Circuit Card, eUICC delete the user subscription and the information related to the profile, and send, to the network entity 20, an acknowledgment of the deletion of the profile.

In an embodiment, the request for deleting the profile comprises data signed by the device 10.

The present teachings also encompass a computer program 102 for a SM-PD entity 19 for purging a subscription. The computer program 102 comprises computer program code, which, when executed on at least one processor on the SM-PD entity 19, causes the SM-PD entity 19 to perform the method 90 according to any of the described embodiments.

The present teachings also encompass computer program products 101 for a SM-PD entity 19. The computer program product 101 comprises the computer program 102 for implementing the embodiments of the methods as described, and a computer readable means on which the computer program 102 is stored. The computer program product, or the memory, thus comprises instructions executable by the processor 100. Such instructions may be comprised in a computer program, or in one or more software modules or function modules. The computer program product 101 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 12:
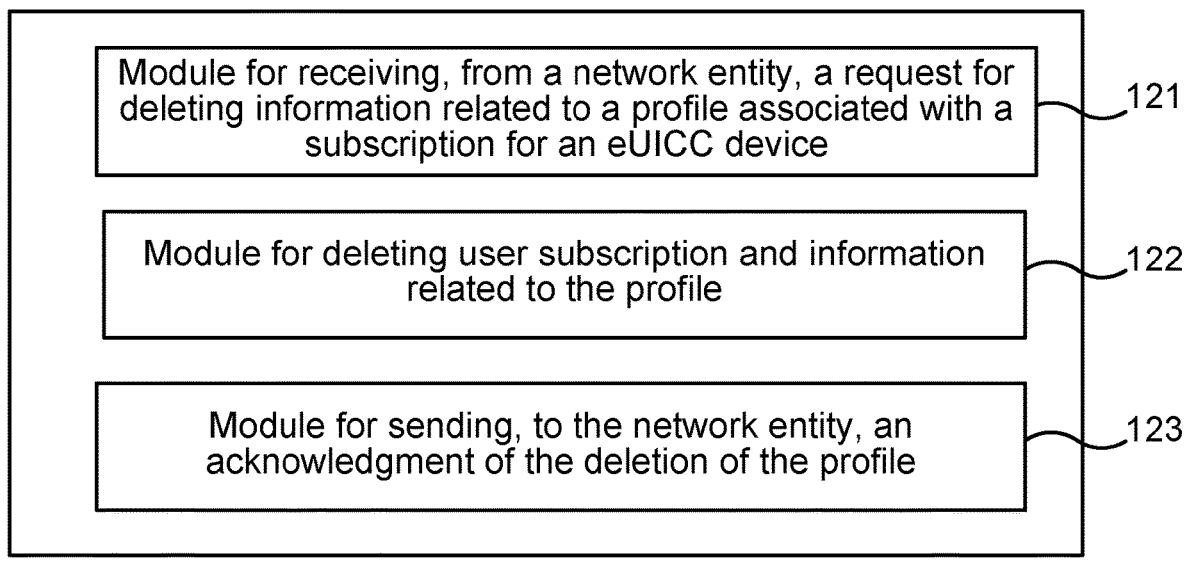
FIG. 12 illustrates a Subscription Manager Data Preparation entity comprising function modules/software modules for implementing embodiments of the present teachings.

FIG. 12 illustrates a Subscription Manager Data Preparation entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 90 that has been described in various embodiments.

A Subscription Manager Data Preparation entity is provided for purging a subscription. The Subscription Manager Data Preparation entity comprises a first module 121 for receiving, from a network entity a request for deleting information related to a profile associated with a subscription for a device comprising an Embedded Universal Integrated Circuit Card, eUICC. Such first module 121 may, for instance, comprise receiving circuitry or an input device.

The Subscription Manager Data Preparation entity comprises a second module 122 for deleting the user subscription and the information related to the profile. Such second module 122 may, for instance, comprise processing circuitry adapted for deleting profiles.

The Subscription Manager Data Preparation entity comprises a third module 123 for sending, to the network entity, an acknowledgment of the deletion of the profile. Such third module 123 may, for instance, comprise transmitting circuitry or an output device.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a device comprising an Embedded Universal Integrated Circuit Card, eUICC, comprising:
   receiving user input targeting a profile provisioned in the eUICC for deletion, the profile being associated with a subscription with a Mobile Network Operator (MNO);
   determining whether deletion of the profile is allowed; and
   responsive to determining that deletion of the profile is allowed:
   deleting the profile from the eUICC;
   generating a signed confirmation indicating that the profile has been deleted from the eUICC, where the signature used to sign the confirmation is verifiable using a certificate associated with the eUICC;
   sending the signed confirmation of the deletion of the profile from the eUICC to a network entity; and
   receiving, from the network entity, an acknowledgment that the signed confirmation was received.

2. The method of claim 1, further comprising using information associated with the profile, as stored in the eUICC, to contact the network entity.

3. The method of claim 1, wherein the network entity is a Subscription Manager Data Preparation entity.

4. A device comprising an Embedded Universal Integrated Circuit Card, eUICC, a processor, and a memory comprising software instructions, which when executed by the processor, configures the device to:
   receive user input targeting a profile provisioned in the eUICC for deletion, the profile being associated with a subscription with a Mobile Network Operator (MNO);
   determine whether deletion of the profile is allowed; and
   responsive to determining that deletion of the profile is allowed:
   delete the profile from the eUICC;
   send a signed confirmation of the deletion of the profile from the eUICC to a network entity; and
   receive, from the network entity, an acknowledgment indicating reception of the signed confirmation.

5. The device as claimed in claim 4, wherein the device is further configured to use information associated with the profile, as stored in the eUICC, to contact the network entity.

6. The method of claim 1, wherein the network entity is a Subscription Manager Data Preparation entity.

7. A method performed in a network entity associated with a mobile network of a Mobile Network Operator (MNO), comprising:
   receiving, from a device comprising an Embedded Universal Integrated Circuit Card, eUICC, an indication that a user of the device has requested deletion of a profile associated with a subscription with the MNO;
   in response to determining that deletion of the profile is allowed, sending a response to the device, indicating that the eUICC has permission to proceed with deleting the profile from the eUICC; and
   in response to receiving a signed confirmation from the device indicating that the profile has been deleted from the eUICC and verifying the signature used to sign the confirmation, deleting the profile from a database of the network entity.

8. The method of claim 7, wherein the network entity is a Subscription Manager Data Preparation entity.

9. The method of claim 7, further comprising sending an acknowledgment to the device, indicating that the subscription and the profile have been deleted in the network entity.

10. A network entity configured for operation in mobile network of a Mobile Network Operator (MNO), the network entity comprising a processor and a memory comprising software instructions, which when executed by the processor, configures the network entity to:
- receive, from a device comprising an Embedded Universal Integrated Circuit Card, eUICC, an indication that a user of the device has requested deletion of a profile associated with a subscription with the MNO;
- in response to determining that deletion of the profile is allowed, send a response to the device, indicating that the eUICC has permission to proceed with deleting the profile from the eUICC; and
- in response to receiving a signed confirmation from the device indicating that the profile has been deleted from the eUICC and verifying the signature used to sign the confirmation, delete the profile from a database of the network entity.

11. The network entity as claimed in claim 10, wherein the network entity is a Subscription Manager Data Preparation entity.

12. The network entity as claimed in claim 10, wherein the network entity is further configured to send an acknowledgment to the device, indicating that the profile has been deleted in the network entity.

* * * * *